(12) United States Patent
Greenbaum

(10) Patent No.: US 12,349,739 B2
(45) Date of Patent: Jul. 8, 2025

(54) SYSTEM AND METHOD FOR VAPORIZATION DEVICE RESUPPLY BASED ON USAGE DATA

(71) Applicant: GLAS, INC., Los Angeles, CA (US)

(72) Inventor: Sean Greenbaum, Los Angeles, CA (US)

(73) Assignee: GLAS, INC., Inglewood, CA (US)

( * ) Notice: Subject to any disclaimer, the term of this patent is extended or adjusted under 35 U.S.C. 154(b) by 674 days.

(21) Appl. No.: 17/487,335

(22) Filed: Sep. 28, 2021

(65) Prior Publication Data

US 2022/0095697 A1 Mar. 31, 2022

Related U.S. Application Data

(60) Provisional application No. 63/085,565, filed on Sep. 30, 2020.

(51) Int. Cl.
*G06Q 10/087* (2023.01)
*A24F 40/53* (2020.01)
(Continued)

(52) U.S. Cl.
CPC .............. *A24F 40/65* (2020.01); *A24F 40/53* (2020.01); *A24F 40/60* (2020.01); *G06Q 10/087* (2013.01)

(58) Field of Classification Search
CPC .......... A24F 40/65; A24F 40/53; A24F 40/60; G06Q 10/087; G06Q 10/20; G06Q 30/0631; G06Q 30/0633
See application file for complete search history.

(56) References Cited

U.S. PATENT DOCUMENTS 8,402,976 B2   3/2013  Fernando et al.
8,851,081 B2  10/2014  Fernando et al.
(Continued)

FOREIGN PATENT DOCUMENTS

CA         3114852 A1  *  4/2020  ............. A24F 40/10
WO   WO-2019173923 A1  *  9/2019  ............. A24F 40/42

OTHER PUBLICATIONS

International Search Report for PCT Application No. PCT/US2021/052304 dated Jan. 31, 2022.
(Continued)

*Primary Examiner* — Ashford S Hayles
(74) *Attorney, Agent, or Firm* — MARSHALL, GERSTEIN & BORUN LLP

(57) ABSTRACT

Systems, methods, devices, and computer-readable media storing instructions for predicting and facilitating resupply of vaporization device cartridges are disclosed. Vaporization usage data generated by a vaporization device is sent to a mobile device or remote server for analysis to determine when additional supply of cartridges will be needed. The vaporization usage data may include information regarding usage of the vaporization device by a user (e.g., puff count, average puff length, average daily use), which information may be used to estimate when a current cartridge (and any known spare cartridges) will be depleted. Based upon this estimate, a resupply order may be automatically placed or may be proposed to the user. Alternatively, information regarding nearby retail locations having appropriate replacement cartridge inventory may be generated and sent to the user to facilitate the user obtaining a resupply.

17 Claims, 9 Drawing Sheets

(51) Int. Cl.
*A24F 40/60* (2020.01)
*A24F 40/65* (2020.01)

(56) References Cited

U.S. PATENT DOCUMENTS

| | | | |
|---|---|---|---|
| 9,565,513 B1 | 2/2017 | Malek et al. | |
| 10,531,693 B1 | 1/2020 | Greenbaum | |
| 10,653,189 B1 | 5/2020 | Greenbaum | |
| 10,737,041 B1* | 8/2020 | Adelaar | A61M 15/06 |
| 10,750,791 B1 | 8/2020 | Greenbaum | |
| 10,757,980 B1 | 9/2020 | Greenbaum | |
| 10,786,013 B2 | 9/2020 | Greenbaum | |
| 10,984,380 B1 | 4/2021 | Greenbaum | |
| D931,524 S | 9/2021 | Greenbaum et al. | |
| 11,701,479 B1* | 7/2023 | Robinson | A24B 15/167 |
| | | | 128/200.16 |
| 2004/0143505 A1 | 7/2004 | Kovach | |
| 2007/0018820 A1 | 1/2007 | Chand et al. | |
| 2009/0266358 A1* | 10/2009 | Sacristan Rock | A61M 11/042 |
| | | | 128/203.26 |
| 2010/0205044 A1 | 8/2010 | Scheer | |
| 2012/0048266 A1* | 3/2012 | Alelov | A61M 11/042 |
| | | | 128/203.14 |
| 2012/0240928 A1* | 9/2012 | Bottom | G01F 1/66 |
| | | | 128/203.14 |
| 2013/0122803 A1 | 5/2013 | Forster | |
| 2013/0319439 A1* | 12/2013 | Gorelick | A24F 40/65 |
| | | | 131/329 |
| 2013/0340775 A1* | 12/2013 | Juster | A24F 40/53 |
| | | | 131/273 |
| 2014/0060552 A1 | 3/2014 | Cohen | |
| 2014/0096781 A1* | 4/2014 | Sears | A24F 40/53 |
| | | | 131/328 |
| 2014/0107815 A1 | 4/2014 | LaMothe | |
| 2014/0378790 A1 | 12/2014 | Cohen | |
| 2015/0088307 A1 | 3/2015 | Ackerman | |
| 2015/0327596 A1* | 11/2015 | Alarcon | H04L 67/535 |
| | | | 131/328 |
| 2016/0331025 A1* | 11/2016 | Cameron | G16H 40/63 |
| 2016/0331029 A1* | 11/2016 | Contreras | A24F 40/50 |
| 2016/0331035 A1* | 11/2016 | Cameron | H04M 1/21 |
| 2016/0363917 A1* | 12/2016 | Blackley | G06F 3/0488 |
| 2017/0018000 A1* | 1/2017 | Cameron | G06Q 30/0269 |
| 2017/0027229 A1* | 2/2017 | Cameron | H04L 67/12 |
| 2017/0045150 A1* | 2/2017 | Marsh | H02J 7/342 |
| 2017/0046357 A1* | 2/2017 | Cameron | A24F 40/30 |
| 2017/0046738 A1* | 2/2017 | Cameron | A24F 40/65 |
| 2017/0091853 A1* | 3/2017 | Cameron | G06Q 30/0637 |
| 2017/0093960 A1* | 3/2017 | Cameron | H04W 4/80 |
| 2017/0135411 A1* | 5/2017 | Cameron | A24F 40/50 |
| 2017/0209893 A1* | 7/2017 | Swallow | A61M 11/042 |
| 2017/0258136 A1* | 9/2017 | Hawes | A24F 40/53 |
| 2018/0043114 A1* | 2/2018 | Bowen | A61M 11/042 |
| 2018/0093054 A1 | 4/2018 | Bowen et al. | |
| 2018/0263283 A1* | 9/2018 | Popplewell | A24B 15/167 |
| 2019/0036688 A1 | 1/2019 | Wasily et al. | |
| 2019/0158938 A1* | 5/2019 | Bowen | A24F 40/65 |
| 2019/0240429 A1 | 8/2019 | Skoda | |
| 2020/0000143 A1* | 1/2020 | Anderson | G06F 18/22 |
| 2020/0005924 A1* | 1/2020 | Skoda | G16H 20/13 |
| 2020/0022416 A1* | 1/2020 | Alarcon | G16H 20/13 |
| 2020/0037667 A1* | 2/2020 | Woodcock | A24F 40/53 |
| 2020/0046032 A1* | 2/2020 | Woodbine | H04L 67/12 |
| 2020/0061301 A1* | 2/2020 | Hatamian | A61M 5/31546 |
| 2020/0077706 A1* | 3/2020 | Wilson | A61M 15/009 |
| 2020/0077708 A1* | 3/2020 | Floyd | A24F 40/53 |
| 2020/0146361 A1* | 5/2020 | Silver | G16H 40/67 |
| 2020/0251210 A1* | 8/2020 | Skoda | G16H 20/13 |
| 2020/0305511 A1* | 10/2020 | Wilson | A24F 40/53 |
| 2020/0329775 A1* | 10/2020 | Doyle | A24F 40/60 |
| 2020/0337382 A1* | 10/2020 | Sur | G01C 22/006 |
| 2020/0345078 A1 | 11/2020 | Greenbaum | |
| 2020/0352249 A1* | 11/2020 | Achtien | A61M 15/0066 |
| 2020/0387955 A1* | 12/2020 | Estripeau | G01S 19/42 |
| 2021/0007414 A1 | 1/2021 | Greenbaum | |
| 2022/0030380 A1 | 1/2022 | Sipes | |
| 2023/0144873 A1* | 5/2023 | Lakraa | A24F 40/53 |
| | | | 131/329 |
| 2023/0394949 A1* | 12/2023 | Tran | G06Q 30/0185 |

OTHER PUBLICATIONS

Written Opinion for PCT Application No. PCT/US2021/052304 dated Jan. 31, 2022.

U.S. Appl. No. 17/030,707 entitled "Vaporization Device Having Remotely Controllable Operational Modes" filed Sep. 24, 2020.

* cited by examiner

SYSTEM AND METHOD FOR VAPORIZATION DEVICE RESUPPLY BASED ON USAGE DATA

CROSS-REFERENCE TO RELATED APPLICATIONS

This application claims the benefit of U.S. Provisional Application Ser. No. 63/085,565 filed Sep. 30, 2020, which is incorporated herein by reference.

FIELD OF THE DISCLOSURE

The present innovation relates generally to vaporization devices, systems, methods and computer-readable media used to resupply vaporization devices based on vaporization usage data.

BACKGROUND

Vaporization devices are generally well known in the art. Such devices are typically battery-powered and are often used as smoking substitutes, to simulate smoking or as a smoking cessation aid. Many users also enjoy the wide variety of flavors offered by vaporization.

Vaporization is often preferred to combustion as the temperature is controllable and different temperatures can be used to release different substances into a vapor cloud and, unlike combustion produced by a burning cigarette, no actual smoke is produced by vaporization. Lack of combustion also makes for a more discreet experience for the consumer as there is typically less lingering smell as compared to the combustion of cigarettes.

Vaporization devices can be completely disposable, or the vaporization devices can be resupplied with a replaceable cartridge containing a vaporizable substance. Some vaporization device can also be resupplied with the vaporizable substance itself, relying on the user to refill a permanent cartridge, tub, or pod with the vaporizable substance.

Vaporization devices typically include a battery, a heating element and a cartridge that houses a vapor forming medium. The vapor forming medium often includes a liquid suspension containing nicotine and may include vegetable glycerin or propylene glycol as a carrier, as well as many other vaporizable substances commonly employed in the art. In practice, the user draws air through the device via a mouthpiece, which activates the heating element such that the vapor-forming medium is heated by the heating element to form the resulting vapor. The vapor may be mixed with the air drawn by the user to form an inhalable aerosol.

Those familiar with the industry know that the number of inhalation puffs of aerosol per day, as well as the length of each puff, vary greatly from user to user, thus making it very hard to predict when the user will need to obtain an additional supply of a vaporizable substance.

SUMMARY

This innovation involves predicting, based on vaporization usage data, when a vaporization device user will run out of vaporizable substance and need to be resupplied. Once resupply is predicted to be needed, an action is taken according to various methods to resupply the user with the vaporizable substance.

According to an aspect, a system is provided that includes a vaporization device containing a refillable container or a replaceable cartridge. The vaporization device also includes a sensor that monitors an aspect of use of the vaporization device, a processor configured to execute program logic to monitor vaporization usage data, a battery, a memory and a transceiver. The vaporization device collects and transmits the vaporization usage data from the device and sends either vaporization usage data or a resupply request to an external computing system.

The vaporization usage data collected from the vaporization device may include the number of puffs taken on the device since the cartridge was replaced or the container was refilled, the time of the last resupply, the percent of the substance remaining, or a cartridge identifier. Other information, such the size of the cartridge as well as the particular type or flavor of the substance, may also be transmitted with the vaporization usage data, or this information can be inferred from the cartridge identifier. In order to obtain accurate vaporization usage data, each cartridge may be separately identified and authenticated by obtaining a unique cartridge identifier stored in a cartridge memory of the cartridge, which unique cartridge identifier may be encrypted for further security.

In some embodiments, the system also includes an external computing system which executes instructions to determine when to resupply a vaporization device as well as the resupply requirements. The external computing system may be a mobile device owned by the vaporization device user where the mobile device is coupled to the vaporization device by a wired or wireless means. Also typically included is a non-transitory computer-readable storage medium storing executable instructions for the mobile device, such as an application used on a smartphone or tablet device. In further embodiments, the system also include one or more servers containing computer executable program code stored on a non-transitory computer-readable storage medium to be executed by a processor, as well as storing user records for each vaporization device user. The user records may include information related to age verification, shipping, billing, preferred resupply method, data on the average rate of consumption (e.g., average puffs per day), a typical order for the user (e.g., three menthol flavored replacement cartridges included with each order) or other information associated with the user.

According to a further aspect, a computer-implemented method is provided to predict whether a resupply is necessary by obtaining vaporization usage data, such as the puff count or other data from the vaporization device. Some embodiments additionally consider a programmable fulfillment time and programmable delivery time when predicting when a resupply is necessary. The rate of depletion may be determined (e.g., average puffs/day) and stored in the associated user record. Based on the depletion rate and the capacity of the cartridge, an estimate can be made as to when the substance will be depleted and the user needs to be resupplied. This estimate can be based on an average usage of this type of cartridge for this particular user, or the estimate can be based on the maximum puffs taken by a typical user of this cartridge or refillable container. A user record stored on the external computing system may include age verification information, billing information, a shipping address for the user, a customary resupply order quantity, a number of unused cartridges thought to be in the possession of the user, a user's average puff duration, an average depletion rate, an expected number of puffs per cartridge for the user considering the current cartridge type, a type and flavor of the current cartridge in use, a parameter to indicate a method of resupply, or a percent full or percent empty of the current cartridge in use. The user record may also contain user data that indicates a rate of consumption. In some embodiments, the user record or another record may indicate an estimated fulfillment time for a similar replacement cartridge or an estimated delivery time to the user for the replacement cartridge.

When resupply of the user is predicted to be necessary, multiple methods of resupply are provided. An automatic resupply procedure may be implemented, wherein shipping to the user with automatic billing is performed without user intervention. A confirmed resupply procedure is also supported, wherein the system requests approval, receives an indication of approval from the user, and then performs an action to facilitate resupply to the user. A retail resupply procedure is also supported, wherein the user is sent information (e.g., contact information or location information) for one or more retail sellers based on the location of the user. This location may be the delivery address of the user stored in the user record, or the location may be determined by a request to the user to give their current address or may be automatically determined based upon the current location of the user's mobile device.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Although the following text discloses a detailed description of one or more disclosed examples, it should be understood that the legal scope of the property right is defined by the words of the claims set forth at the end of this patent. Accordingly, the following detailed description is to be construed as illustrating examples, but does not describe every possible example, as describing every possible example would be impractical, if not impossible. Numerous alternative examples could be implemented, using either current technology or technology developed after the filing date of this patent. It is envisioned that some such alternative examples would still fall within the scope of the claims.

Figure 1:
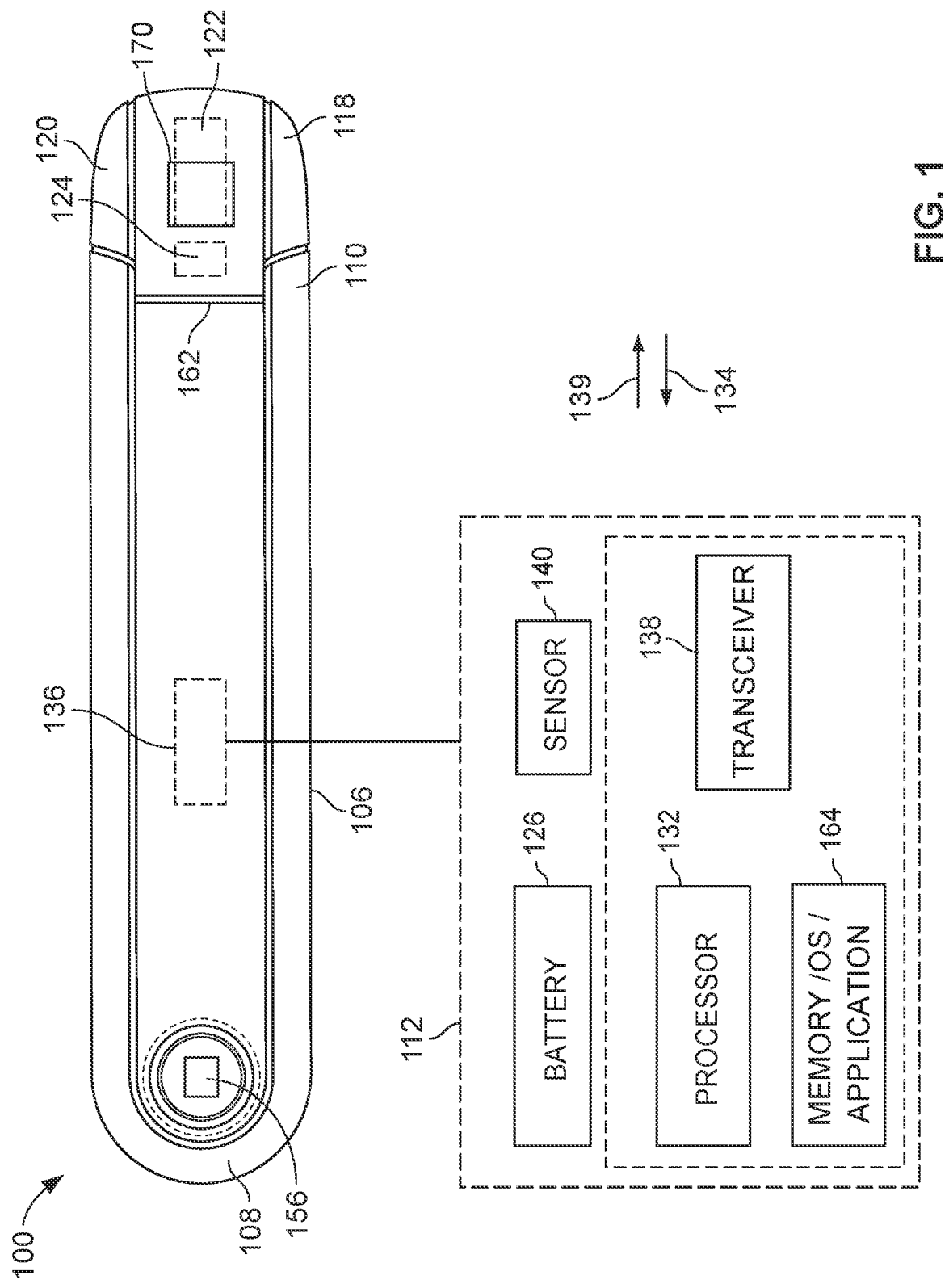
FIG. 1 is a block diagram of an exemplary vaporization usage data system, including a vaporization device, partly in schematic form, configured for generating and conveying a signal containing vaporization usage data transmitted from the vaporization device to a computing system.

FIG. 1 is a block diagram of an exemplary vaporization usage data system, showing a plan view of a vaporization device 100, partly in schematic form, configured for generating and conveying a signal containing vaporization usage data transmitted from the vaporization device to a computing system. The vaporization device 100 may include a removable cartridge having a mouthpiece attached to a body portion. The vaporization device 100 is shown with a processor 132, battery 126, memory 164, sensor 140 and a transceiver 138 for generating and conveying a signal 139, which may contain vaporization usage data or a resupply order transmitted from the vaporization device 100 to a computing system 230, as discussed below. The transceiver 138 of the vaporization device 100 may also accept a signal 134, such as an acknowledgement or other signal from the computing system 230.

The vaporization device 100 includes a body 106 having a first end 108, a second end 110, and an area forming an internal cavity 112. The vaporization device 100 further includes a cartridge receptacle 162 for receiving a replaceable cartridge 118 or a refillable container for vaporizable content (not shown). The replaceable cartridge 118 is configured to be removably inserted within the body 106 of the vaporization device 100 (e.g., within an opening of the cartridge receptacle 162 at the second end 110) and to connect with electrical connections (not shown) of the body 106 to receive power and to send or receive information. The replaceable cartridge 118, as would be known to those of skill in the art, includes a mouthpiece 120 and a storage container 122 for storing a quantity of a vaporizable content, which is typically in liquid form. The vaporizable content may include, for example, a nicotine liquid as commonly employed in the art, although the medium may also include a solid, or consist of a botanical essence, a flavor, or any other vaporizable content of the type commonly employed in the art. The cartridge 118 also includes a heating element 124 which operates to heat and thus vaporize a quantity of the vaporizable content. In some embodiments, the cartridge 118 further includes a cartridge memory 170 storing an identifier of the cartridge, which is preferably a unique cartridge identifier that enables identification of a specific cartridge when the cartridge 118 is secured to the body 106 and which may further be encrypted in order to secure the device and to prevent counterfeiting.

A battery 126 is disposed in the internal cavity 112 in any suitable manner. The battery 126 may be removable and/or rechargeable and may be of the type commonly employed in the art. The heating element 124 and the battery 126 are operatively coupled to one another when the cartridge 118 is attached to the body 106. Typically, a portion of the cartridge 118 extends into the cartridge receptacle 162 when the cartridge 118 is secured to the body 106. The cartridge is a storage container of vaporizable content. As is well known to those of skill in the relevant art, the heating element 124 is arranged to apply heat to and thus vaporize a quantity of the vaporizable content from the storage container 122 of the cartridge 118. As would also be known, the heating element 124 is typically activated when a user, via the mouthpiece 120, draws air that enters through a suitable vent and flows through the vaporization device 100. Consequently, as would be known, the activated heating element 124 vaporizes the vaporizable content in the storage container 122, allowing the vapor (typically mixed with air) to be drawn out of the mouthpiece 120 for inhalation by the user. In some embodiments, a portion 136 of the body 106 is arranged to permit transmission of the signal 134 from a location external to the body 106 through the portion 136 of the body and to permit a signal 139 from inside the body 106 to an external location.

The vaporization device 100 also includes a sensor 140 coupled to the processor 132 that monitors an aspect of use of the vaporization device 100. The sensor 140 may include a component to monitor or detect a physical property or operation of the vaporization device, such as a heat sensor, an air flow sensor, a current or voltage sensor, a pressure sensor, or any other suitable type of sensor for measuring an aspect of usage of the vaporization device 100. The processor 132 is operatively coupled to the sensor 140 and operatively coupled to the battery 126 in a suitable fashion. Using the sensor 140, the processor 132 may count the puffs of the user, determine a remaining quantity of a vaporizable content, estimate a percentage of the container currently filled with vaporizable content, determine a rate of consumption or otherwise monitor the vaporization usage data.

The processor 132 is configured to execute program logic stored in the memory 164 of the vaporization device 100, which may comprise any suitable non-transitory computer-readable storage media. In some cases, the vaporization device 100 may include an illumination assembly 156 which is operatively coupled to the processor 132 and the battery 126 to indicate to the user the status of the vaporization device 100. The processor 132 is arranged to generate and communicate any of several signals 139 by way of a transmitter or a transceiver 138 (such as a wireless transceiver) to an external computing system 230, which may include a mobile device 202. In an embodiment, the program logic configures the processor 132 to determine that a resupply is necessary and to generate a signal 139 to indicate a resupply is requested, which signal 139 is transmitted to the computing system 230 (shown in FIG. 2) when the vaporizable substance drops below a threshold level stored in the memory 164 of the vaporization device 100. In another embodiment, the program logic configures the processor 132 to generate a signal 139 to the computing system 230 which contains vaporization usage data. The usage data may include a cartridge identifier, as well as one or more of a puff count, a time since the cartridge was replaced, an average puff duration, a percentage of the content of the cartridge used or a percentage of the content of the cartridge remaining.

The vaporization device memory 164 can also be used to store a threshold value, which may be fixed or variable, below which the vaporization substance needs to be resupplied. The memory 164 may also store commands, puff counts, puff durations, cartridge replacement times, last refill time, reference temperatures, cartridge identifiers or any other data relating to the vaporization device 100 vaporization substance, or vaporization cartridge 118. The commands can be executed by the processor 132 to determine when a resupply is necessary and generate a resupply request to the computing system 230 or, in another embodiment, transmit vaporization usage data to the computing system 230. In some embodiments, such functions may be performed by the processor 132 executing one or more applications stored in the memory 164 to monitor usage of the vaporization device 100, which may include security or verification functions, cartridge status functions, vaporization monitoring functions, external communication functions, resupply functions or other functions as described herein. Some or all of such functions may be performed in whole or part by external components in electronic communication with the vaporization device 100, as described further herein.

Figure 2:
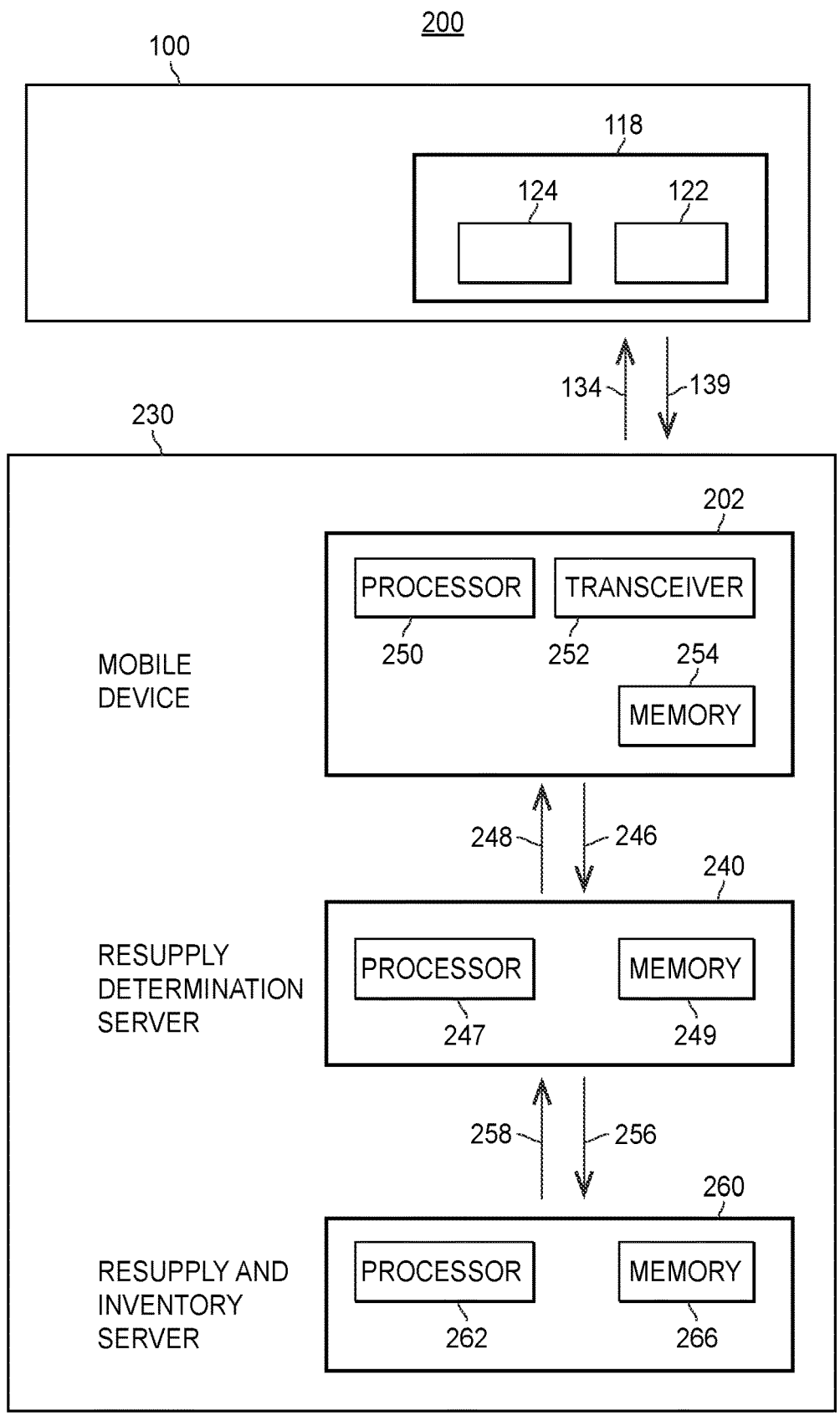
FIG. 2 is an exemplary block diagram of an exemplary resupply system including a vaporization device conveying a signal to a computing device, which is connected to a resupply determination server itself connected to a second resupply and inventory server.

FIG. 2 is an exemplary block diagram illustrating an exemplary resupply system 200 including the vaporization device 100 and an external computing system 230. In FIG. 2, the illustration of the external computing system 230 includes a mobile device 202, a resupply determination server 240, and a resupply and inventory server 260. The external computing system 230 may also include a database of user records (not shown) which may be part of or operatively connected to either or both of the resupply determination server 240 or the resupply and inventory server 260. In some embodiments, the database of user records is stored in the memory 249 of the resupply determination server 240 for use in determining when to resupply vaporizable content to a user associated with the vaporization device 100. Each of the mobile device 202, the resupply determination server 240, and the resupply and inventory server 260 of the external computing system 230 includes one or more processors 250, 247, 262 as well as one or more memories 254, 249, 266 (e.g., RAM, NVRAM, ROM, EPROM, EEPROM or similar tangible, non-transitory computer-readable media configured for storing data and executable instructions). The processors 250, 247, 262 are configured to execute program logic instructions contained on non-transitory computer-readable storage media, including programmable instructions contained in the respective memories 254, 249, 266.

The mobile device 202 may be a cell phone, a smartphone, a smart device such as a smart watch, a computer, a tablet, or any other device suitable for communicating with the vaporization device 100. Alternatively, the mobile device 202 may be a beacon (e.g., a low-powered transmitter). The connectivity between the vaporization device 100 and the mobile device 202 may be a wired connectivity such as through a universal serial bus (USB) or micro USB port of the vaporization device 100, or it may be a wireless connectivity through use of a transmitter or transceiver 138. In the wireless case, a wireless communication link may be provided by wireless protocols such as IEEE 802.11 (Wi-Fi), Near Field Communication (NFC), Bluetooth® or Bluetooth Low Energy® (BLE) or other wireless protocols. The mobile device includes a processor 250, a transceiver 252 (or separate transmitter and receiver elements) and a memory 254 which may contain executable program logic. In this illustration, the mobile device 202 is, in turn, wirelessly connected, such as by IEEE 802.11 protocol or via 4G or 5G or other radio access network protocols to a cellular network or other communication network (not shown). Such communication network is connected to a resupply determination server 240, which is connected to a resupply and inventory server 260 through the Internet, a Local Access Network, or another traditional method of network interconnection.

In this exemplary resupply system 200, the resupply determination server 240 performs a resupply determination based upon vaporization usage data received from the vaporization device 100. The resupply determination server 240 comprises a processor 247 and a memory 249 containing computer executable instructions that cause the computing system to determine when to resupply the user with a replaceable cartridge or a quantity of vaporizable content. The executable instructions cause the resupply determination server 240 to receive vaporization usage data from a vaporization device 100 (e.g., via a mobile device 202) and determine when a resupply of a vaporizable substance is necessary. Either the resupply determination server 240 or the resupply and inventory server 260 may access a database which includes a user record for each of a plurality of users associated with vaporization devices 100. The resupply determination server 240 accepts the vaporization usage data from the vaporization device 100 forwarded by way of the mobile device 202. When the usage data is received, the resupply determination server 240 associates the vaporization usage data with a user record and determines whether a resupply of the vaporization device 100 needs to be initiated based on the vaporization usage data and other information which may be stored in the user record. Data in the user record may include, for example, the type of resupply preferred by the user, an estimated usage rate for this user, and in some embodiments an estimated fulfillment time or an estimated delivery time.

Once the resupply is determined to be necessary to keep the user adequately supplied with the vaporizable content, the resupply determination server 240 may access the user record to determine how the resupply is to be performed. If the user record indicates the resupply is to be performed automatically, the executable instructions cause the computing system 230 to take an action to automatically facilitate resupply of the user. The resupply determination server 240 may send a signal 257 to the resupply and inventory server 260, which comprises a processor 262 and memory 266 storing executable code as well as data (e.g., user records). The resupply and inventory server 260 consults the user record for the associated user to determine the delivery address and initiates a resupply to the user. After the resupply is performed (or after performance has been ordered), the resupply and inventory server 260 sends a signal 258 to the resupply determination server that the resupply has occurred or is occurring, and the resupply determination server 240 in turn signals 248 the mobile device 202 that the resupply has been or will be delivered to the user.

In another resupply embodiment, the user record indicates that the resupply is of a type "confirm" which indicates the resupply is to be confirmed by the user. In such embodiment, the executable instructions cause the computing system 230 to take an action to confirm resupply of the user, and the computing system 230 facilitates the resupply after confirmation by the user. In this case, the resupply determination server 240 sends a signal 248 to the mobile device 202 to confirm that the user wants to be resupplied, which may include one or more options regarding the resupply (e.g., quantity, timing, or type of cartridges). Once a confirmation signal 246 is received (which may include user selections or adjustments regarding resupply options), the resupply determination server 240 sends a signal 256 to the resupply and inventory server 260 to fulfill the order. After receiving a signal 258 from the resupply and inventory server 260 that the order has been fulfilled, the resupply determination server 240 signals 248 the user's mobile device 202 that the resupply is on the way.

In yet another embodiment the user record indicates that resupply is to be performed at a retail location. The executable instructions cause the computing system 230 to take an action to provide the user with contact information for one or more retailers of the vaporizable substance or cartridges. In this embodiment, the resupply determination server 240 determines the location of the user. This location can be determined from the shipping address in the user record or it can be determined from the user replying via the mobile device with their current location (e.g., their currently postal code). In some embodiments, the location is derived automatically from the location of the mobile device 202. In such case, the resupply determination server 240 sends a signal 248 to the mobile device 202 to query its location. Once the location signal 246 is received, the computing system 230 determines a retailer of the product after consulting a database of retailers (e.g., via the resupply and inventory server 260), and one or more nearby retailers are selected. The resupply determination server 240 may provide to mobile device 202 contact information, including a street address, Internet Protocol (IP) address, web address, telephone number or other contact information for one or more nearby retailers of replaceable cartridges or vaporizable content. In another embodiment, the resupply determination server 240 may provide the contact information for a retailer which has a known supply of the type of cartridge currently in use by the user (e.g., a flavor, strength, or capacity), which may be different from the nearest retailer. In another example, the computing system 230 may provide to the mobile device 202 a suggestion of an alternate type of cartridge or container of vaporizable substance which is immediately available at the nearby retailer.

Figure 3A:
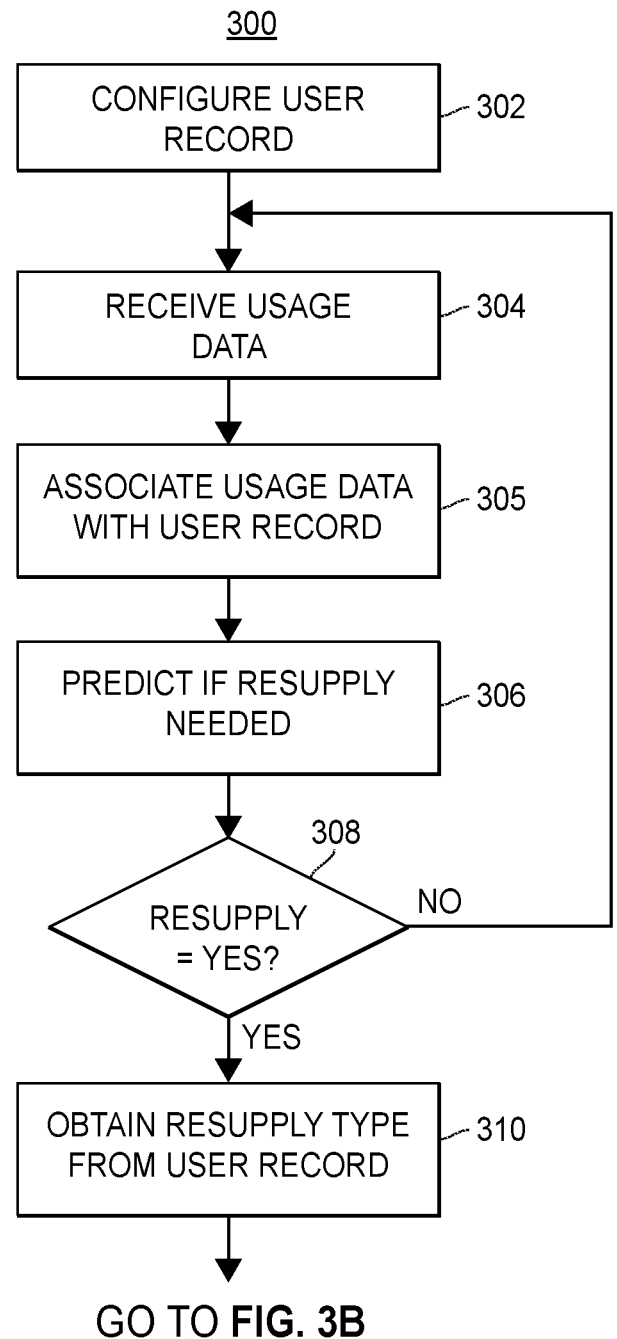
FIG. 3A is a flow diagram showing a first part of an exemplary resupply method executed by a computing system to receive the vaporization usage data and determine whether cartridge resupply is needed.
Figure 3B:
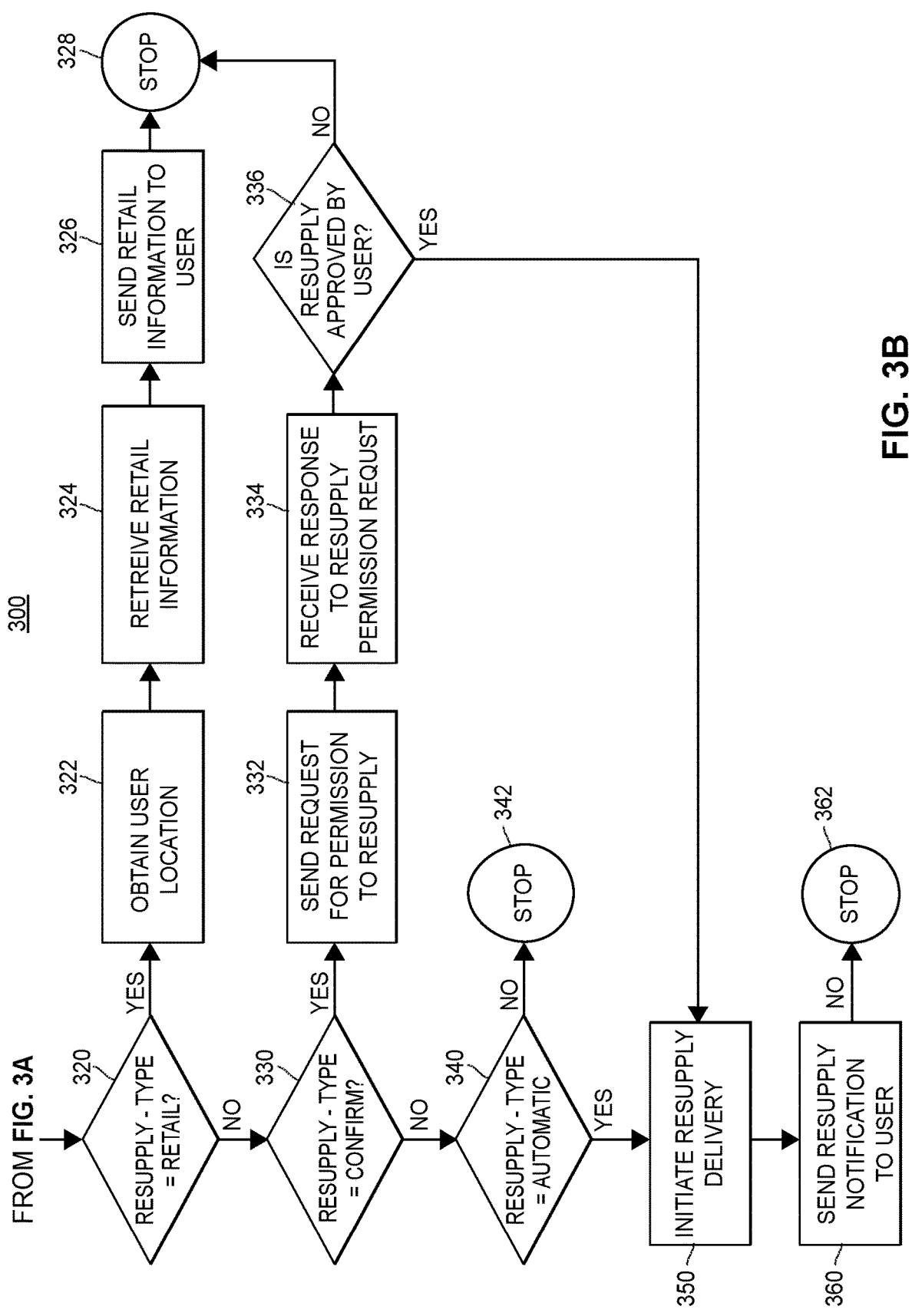
FIG. 3B is a flow diagram showing a second part of the exemplary resupply method executed by a computing system to resupply a cartridge or vaporizable substance to the user.
Figure 4:
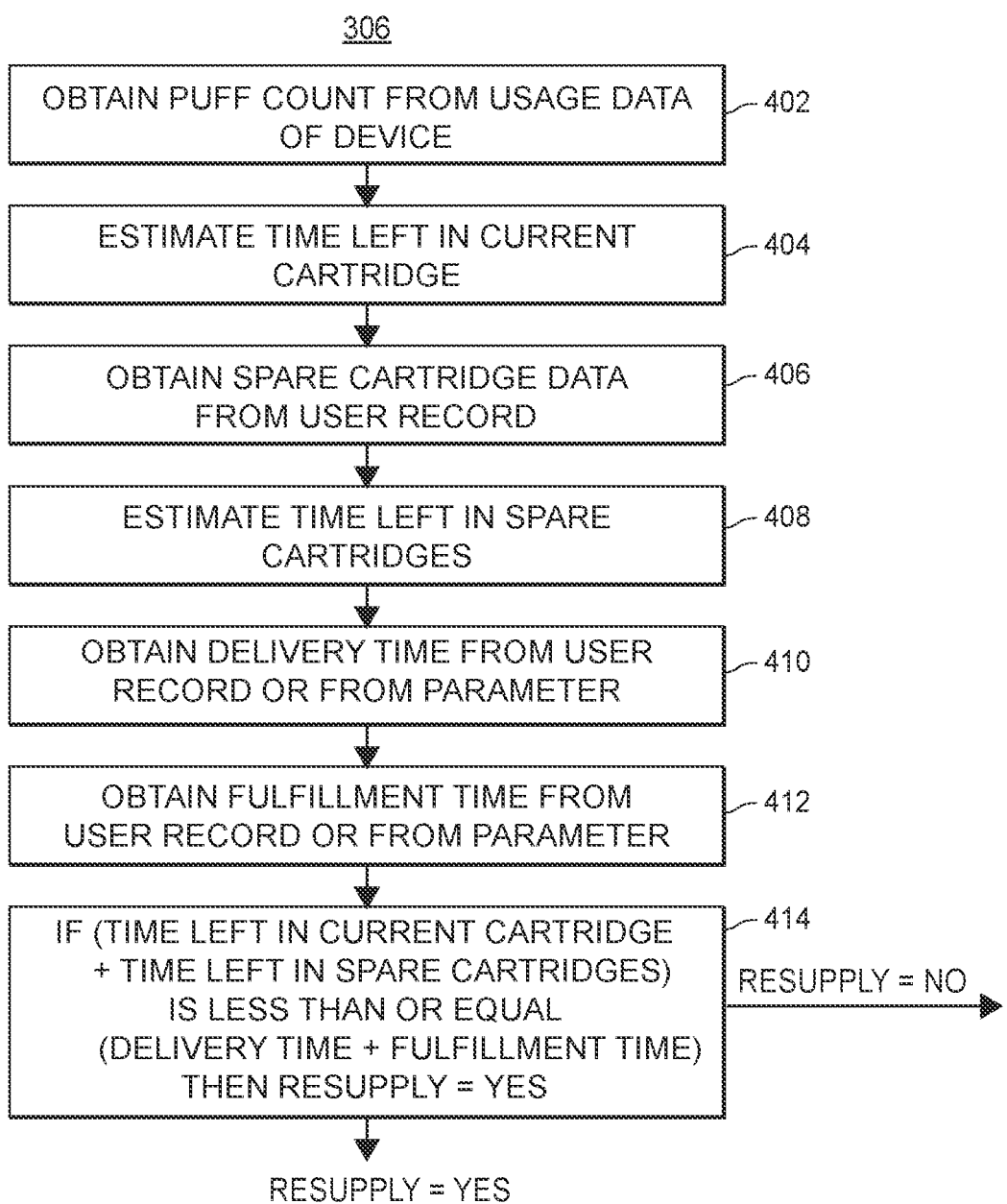
FIG. 4 is a flow diagram showing an exemplary resupply determination method that may be implemented to determine whether a resupply is needed.

FIG. 3A, FIG. 3B and FIG. 4 are flow diagrams illustrating an exemplary method of determining when a resupply is needed (in FIG. 3A) and an exemplary method of facilitating a resupply showing multiple methods of resupply (in FIG. 3B), as well as showing more details regarding predicting when the resupply is needed (in FIG. 4). Various actions of the exemplary methods described below may be implemented by the components of the computing system 230 in communication with the vaporization device 100.

Together, FIGS. 3A and 3B illustrate an exemplary resupply method 300. FIG. 3A begins at block 302 with the computing system 230 obtaining user information and configuring the user record. This information includes previously specified user preferences and other data relating to the user, which may include a previously obtained age verification for the user. In some embodiments, the user data may also include a previously specified delivery address and billing information for the user. The user record may eventually also contain a history of vaporization supplies the user has ordered, as well as user average vaporization data (e.g., an average puff count per cartridge, an average consumption rate, and other usage information for the user). The user record may be generated and stored on the resupply determination server 240. At block 304, the computing system 230 receives vaporization usage data from the vaporization device 100. In some embodiments, the mobile device 202 may receive the vaporization usage data from the vaporization device 100 via wireless communication, which vaporization usage data may be processed by the mobile device 202 or sent to the resupply determination server 240 for further analysis. At block 305, the computing system 230 associates the received vaporization usage data with the user record. This may include identifying the user record based upon a user identifier included in a message containing the vaporization usage data. In some embodiments, this may further include storing the received data in the user record, storing a summary of the data in the user record, updating variables or fields of the user record based upon the data.

At block 306, the computing system 230 (e.g., the resupply determination server 240 or the mobile device 202) predicts whether a resupply of a vaporizer cartridge or vaporizable content is needed by the user, based upon the received vaporization usage data and the user record. In some embodiments, the vaporization usage data sent by the vaporization device 100 includes a time of the last refill (or cartridge replacement) or an indicator of how much vaporization substance is left (e.g., half full, one quarter full, etc.). In further embodiments, the vaporization usage data may additionally or alternatively include measured data regarding cartridge usage, such as puff counts, puff durations, temperatures of usage, cartridge insertions or removals, cartridge details (e.g., types and capacities) or other information regarding specific usage of the vaporization device 100 or regarding the specific cartridge usage. Based on the vaporization usage data, such as the amount of time elapsed and the amount of substance remaining (and also consulting a programmable estimated fulfillment time and a programmable estimated delivery time in some embodiments), the computing system 230 can predict when a resupply shipment is needed. The programmable estimated delivery time and programmable estimated fulfillment time may be stored in the user record of the vaporization device user or stored as a system parameter elsewhere in the computing system 230. For example, an exemplary prediction method, with the prediction based on the puff count, is discussed in further detail below with reference to FIG. 4. At block 308, when a resupply is determined not to be needed, the computing system 230 returns to collecting vaporization usage data at block 304 above. If a resupply is determined to be needed at block 308, the computing system 230 obtains the preferred resupply type from the user record at block 310 (e.g., automatic refill, confirmed refill, or retail refill), then proceeds to facilitate resupply as illustrated in FIG. 3B.

Moving to FIG. 3B, if the user record indicates that the preferred resupply type is retail, as shown in block 320, the computing system 230 next obtains the user's location as shown in block 322. This location may be determined from the shipping address in the user record. In another embodiment, the location determination may include prompting the user to enter a shipping address (e.g., a current street address, city, or postal code). In yet another embodiment, the mobile device 202 or other element in a telecommunication network is automatically queried for the location of the mobile device 202 at block 322, and a response is transmitted back to either the resupply determination server 240 or the resupply and inventory server 260 without user intervention. The automatic location determination may, in some cases, be the preferred method, but the resupply method 300 may fall back to prompting the user for a location in some situations (e.g., if the mobile device location is unavailable, such as when location services are disabled by the user on the mobile device 202, or if the user record does not include a current user address). Once the user's location is determined at block 322, the computing system 230 retrieves a retail location 324 from a database of retailers stored by the computing system 230. This location may be a street address or other indication of a physical location of a retailer (e.g., Global Positioning System (GPS) coordinates), which may further be associated with an internet protocol (IP) address, a web address or a telephone number for the nearest retail location. In some embodiments, the computing system 230 may identify the nearest physical retail location that has the user's preferred type of cartridge in stock. Retailer stock may be determined based upon a database of current stock maintained by the resupply and inventory server 260 or may be determined by automated communication with one or more servers associated with nearby retailers. The retail location with adequate stock as determined by resupply and inventory server 260 may be a different retail location than the nearest retail location. The computing system 230 then sends retailer information (e.g., a street address, a web address, an Internet Protocol address or a Uniform Resource Locator (URL) or a phone number for the retail location) to the user's mobile device 202 at block 326. In another embodiment, if the preferred type of cartridge or vaporizable content is not in stock at any nearby location, the computing system 230 may suggest a different type of cartridge or vaporizable content that is available at a nearby location (e.g., a different flavor) and send the substitute information with retailer information to the mobile device 202. The resupply method 300 then ends at block 328.

If the preferred resupply type is not retail, the computing system 230 may determine from the user record whether the user's preferred supply type is to confirm or request approval prior to each resupply at block 330. In the case of the user needing to confirm the resupply, the computing system 230 sends a request to the user (e.g., sends a signal from the resupply determination server 240 to the mobile device 202 or presents a message to the user via a display of the mobile device 202) to prompt the user to approve the resupply, as shown at block 332. In some embodiments, the request to the user may include details regarding the resupply, such as a number and type of cartridges, an estimated delivery date, a cost for the order or options regarding the resupply. Upon receiving an indication from the user whether the resupply has been approved or not at block 334 (including an indication of any options selected by the user), the computing system 230 examines the response indication at block 336. If not approved, the confirm resupply method stops at block 328. If an indication of approval is received from the user, either the resupply determination server 240 or resupply and inventory server 260 performs an action to resupply cartridges or vaporizable content to the user by initiating a delivery procedure at block 350. This delivery procedure will typically consult a preferred type and quantity of substance as indicated in the user record for that user. If the response includes any user-selected options regarding the resupply, the computing system 230 determines the resupply parameters based at least in part upon such received user selections. After the resupply has been initiated at block 350, a notification is sent to the user at block 360 to indicate that the user is being resupplied. Such notification may provide details regarding the delivery, as well as an option to cancel the delivery in some embodiments. The resupply method 300 then ends at block 362.

If the preferred resupply type is not retail or confirmed delivery, the computing system 230 may determine from the user record whether the preferred resupply method is an automatic resupply type at block 340. If the preferred resupply type is also not automatic resupply or is undefined in the user record, the resupply method 300 ends at block 342. In the automatic resupply case, however, either the resupply determination server 240 or the resupply and inventory server 260 initiates a resupply delivery at block 350. This delivery determination may consider a preferred type and quantity of cartridges or vaporizable content, as indicated in the user record for that user. To initiate a resupply delivery, the resupply determination server 240 or the resupply and inventory server 260 may generate an order for the determined number and type of resupply to be delivered to a shipping address of the user, as well as facilitating payment processing for the order. Once the resupply has been initiated at block 350, the computing system 230 sends a resupply notification to the user at block 360, and the resupply method 300 ends at block 362.

In some embodiments, when the resupply determination server 240 determines that a resupply is indicated, the user will be provided with additional prompting with an option to cancel or change the order, such as by selecting a different shipping address or a different quantity, type, or flavor of cartridges or container of vaporizable substance that is to be resupplied. In further embodiments, the computing system 230 may override the default user preference if the delivery time plus the fulfillment time is estimated to exceed the estimated user supply by more than a predetermined amount of time (e.g., one day), which would leave the user without an adequate supply for that time. In that case, the logic of the computing system 230 may present a retail location as an option instead of performing an automatic resupply or a confirmed resupply. This override method may be especially desirable to keep users supplied without interruption. This may occur, for example, just after the fulfillment time estimate is increased due to shortage of product or the estimated delivery time is increased due to delivery delays. Such override may generate a notification to the user, who may opt to override the override in order to receive fulfillment of the resupply on a delayed schedule, even though it may result in an interruption of the user's supply of vaporizable content.

FIG. 4 illustrates an exemplary resupply determination method that may be implemented as a technique for predicting when a resupply will be necessary, as an embodiment of the process of block 306 of the resupply method 300 discussed above. Alternative processes for predicting resupply needs at block 306 may be implemented in other embodiments. The method shown in FIG. 4 is based upon the vaporization usage data received from vaporization device 100 using puff counts. At block 402, the computing system 230 (e.g., the mobile device 202 or the resupply determination server 240) obtains usage data containing a puff count from the vaporization device 100. In some embodiments, additional vaporization usage data related to the puff count may also be obtained, such as puff duration data or time since the cartridge was first inserted in the vaporization device 100 (which may include any time a cartridge was removed after first insertion). At block 404, the computing system 230 then generates an estimate of a time left for a current cartridge based upon an average puff rate of the user and the puff count in the current cartridge. Where additional vaporization usage data is obtained, such additional data may further be used to improve the estimate of the remaining vaporizable content or the remaining time for the cartridge. The computing system 230 may also consult a database to determine maximum number of puffs in the cartridge, a total quantity of vaporizable content in the cartridge based upon the cartridge type, or the time since the last cartridge replacement. The user record may contain a previously calculated average puff rate or another measurement of rate of consumption stored with user data in the user record associated with a particular user. The maximum number of puffs in the cartridge may be estimated by what is typical for all users and available as a system parameter for each type of cartridge. Alternatively, for a better estimate, an estimate of the maximum number of puffs per cartridge may be calculated on a per-user basis and stored as user data in the user record. In some embodiments, the computing system 230 may obtain vaporization usage data and generate estimates of time remaining for each of a plurality of cartridges, such as where a user swaps out cartridges before they are depleted. For example, a user may partially use a first cartridge, then replace it with a second cartridge, then replace the second cartridge with the partially used first cartridge. However determined, the maximum number of puffs is compared against the puff count from the vaporization usage data to estimate the remaining puffs, and the time left is then determined based upon the remaining puffs and the average puff rate.

At block 406, the computing system 230 then obtains the spare cartridge data from the user record. This may include user record data regarding cartridge purchases, as well as user record data regarding depletion of previous cartridges, to determine a remaining supply of spare cartridges estimated to be held by the user. Such spare cartridge data may include data regarding one or more additional cartridges possessed by the user that have not yet been used or have not yet been fully used. In some embodiments, the spare cartridge data is based upon user purchase history, such as records of purchases of cartridges by the user. For example, the association of a first cartridge with the user record based upon use and authentication of the cartridge (as discussed further below) may be used to determine a number and type of additional cartridges associated with the user as spare cartridges based upon the cartridges being packaged together in a package containing multiple cartridges (e.g., user purchase of a four-cartridge package may be identified based upon the user inserting a first cartridge from the package into the vaporization device 100, thus indicating three spare cartridges in the user's possession). In some such embodiments, cartridges purchased by the user at some distant point in the past (i.e., cartridges purchased more than some maximum threshold interval prior to the resupply determination) may be disregarded or removed from the user record data in order to improve the accuracy of the spare cartridge data. In further embodiments, the spare record data comprises a list or count of additional cartridges of relevant vaporizable content possessed by the user based upon wireless communication between the mobile device 202 of the user and either communication components of the spare cartridges or communication components of a packaging of the spare cartridges. For example, the spare cartridges or their packaging may include a near-field communication (NFC) or a radio-frequency identification (RFID) tag configured to store and transmit information regarding the spare cartridges (e.g., by backscattering a response signal upon receiving an interrogation signal from the mobile device 202).

At block 408, using the average puff rate, the maximum puff rate or minimum puff rate per cartridge for this user from the user record, the computing system 230 estimates the time left in the users spare cartridges. At block 410, the computing system 230 (e.g., the resupply determination server 240 or the resupply and inventory server 260) may obtain a delivery time estimate from the user record (or, alternately, from a system-wide parameter) indicating the estimated time required for delivery of a shipment to the user after an order has been placed into transit. In a similar fashion, at block 412, the computing system 230 may obtain an estimated fulfillment time from either the user record or a system-wide parameter indicating a time required to process and place an order for the user into transit for delivery.

At block 414, the computing system 230 compares (i) the estimated time left in the current cartridge combined with the estimated time in the spare cartridges against (ii) the combined delivery time and fulfillment time. If the time left in the current cartridge plus the time left in the spare cartridges is less than or equal to the combined delivery and fulfillment times, then resupply of the user is indicated. In some embodiments, a buffer time may be added to the delivery time or the fulfillment time to account for possible delays in resupplying the user or to account for the possibility of the user depleting the current and spare cartridges before the estimated time. Alternatively, a resupply may be triggered based upon an estimate of time until reordering (i.e., the estimated time remaining in the current and spare cartridges less the estimated delivery and fulfilment time) being less than a threshold (e.g., 1 day or 3 days). In some such embodiments, the threshold may be stored in the user record and may be adjusted by the user to match user preferences regarding resupply timing.

In one example, the vaporization device 100 may report that 110 puffs were taken for a particular cartridge currently in use. The computing system 230 may then determine that the user is averaging 100 puffs per day and that the cartridge of this type is expected to contain 300 puffs. Therefore, the computing system 230 may estimate that less than two additional days of use is left on the current cartridge. If the user record stored on the external computing system indicates the user has one spare cartridge, and at 100 puffs/day of usage, the user has three days of use left in the spare cartridge. The user then has just less than five days of usage left in total (3 days+1.9 days). The user record for this user may indicate one day to fulfill the order and an expected delivery time of four days for a replacement cartridge. In this example, the five days to fulfill and deliver the order is greater than the 4.9 days of supply left for the user. Therefore, a resupply may be indicated by the computing system 230. In another example, the computing system 230 may determine that the user has taken 110 puffs but is only consuming at the rate of 50 puffs/day and also has one spare cartridge. In this example the user would have more than nine days of usage left (6 days+3.8 days), so, assuming the same fulfillment and delivery time as above, the resupply would not yet be indicated.

Figure 5:
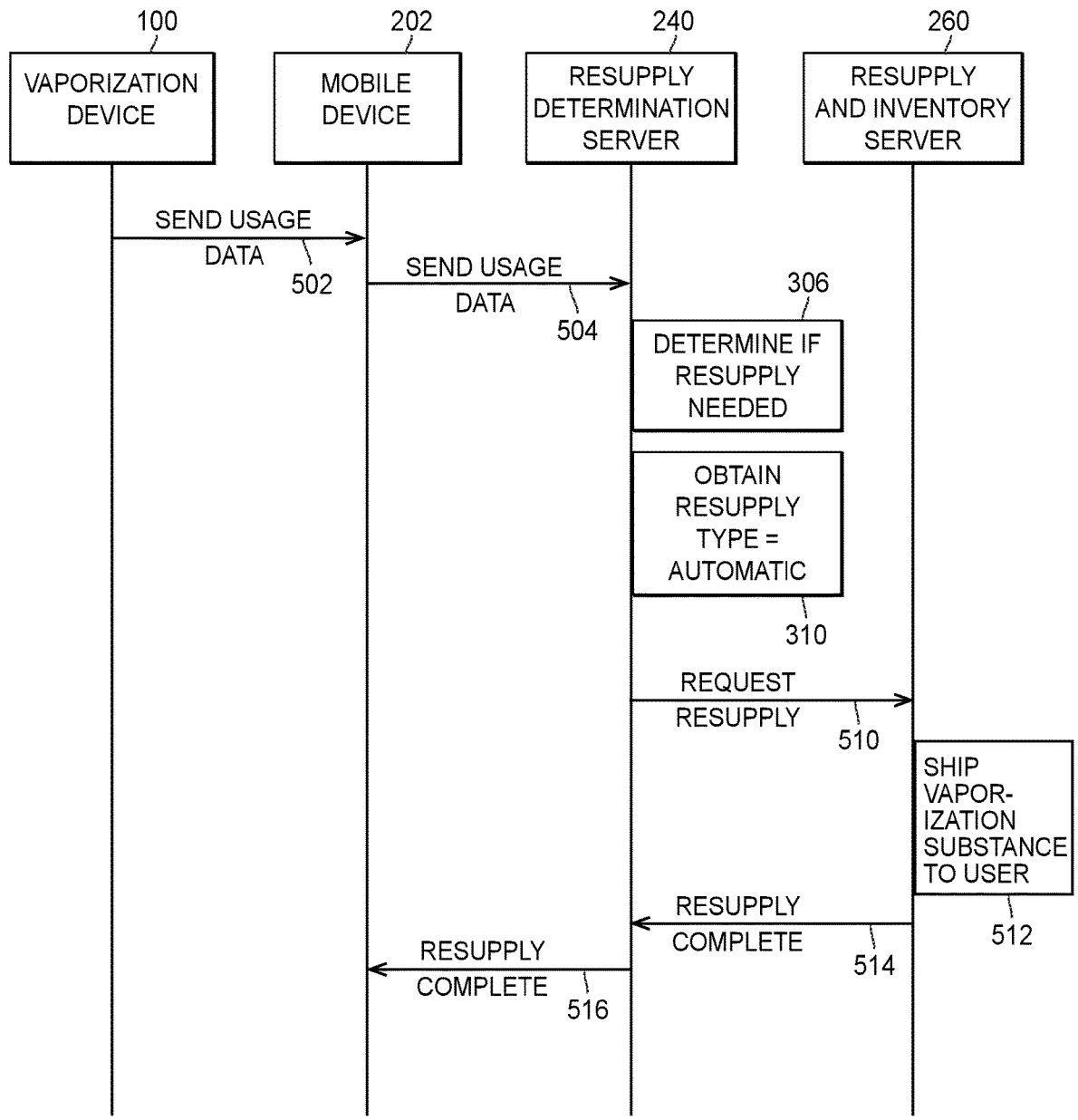
FIG. 5 is a ladder diagram showing signals communicated between elements of the resupply system prior to automatic resupply of a cartridge to a user.

FIG. 5 illustrates a ladder diagram showing signals communicated between elements of the resupply system 200 prior to automatic resupply of a vaporizable substance or cartridge to a user. FIG. 5 shows signals between the vaporization device 100, the mobile device 202, the resupply determination server 240 and the resupply and inventory server 260. To begin the process of automatically resupplying cartridges to a user, the vaporization device 100 sends a signal 502 to the mobile device 202, which contains vaporization usage data. The mobile device 202 then passes the vaporization usage data in signal 504 to the resupply determination server 240. The resupply determination server 240 determines at block 306 that a resupply of the vaporization device 100 is necessary based on the vaporization usage data. At block 310, the resupply determination server 240 obtains the resupply type for this user from the user record, which in this example is indicated to be an automatic resupply. The resupply determination server 240 then sends a signal 510 to the resupply and inventory server 260. In response to the signal 510, the resupply and inventory server 260 takes an action to ship the vaporization substance to the user at block 512 based upon information including the customary order, the delivery address and billing information found in the user record. The resupply and inventory server 260 then sends a signal 514 to the resupply determination server 240 that the user will be resupplied, in response to which the resupply determination server 240 then sends a signal 516 to the mobile device 202 to confirm that a delivery is on the way.

Figure 6:
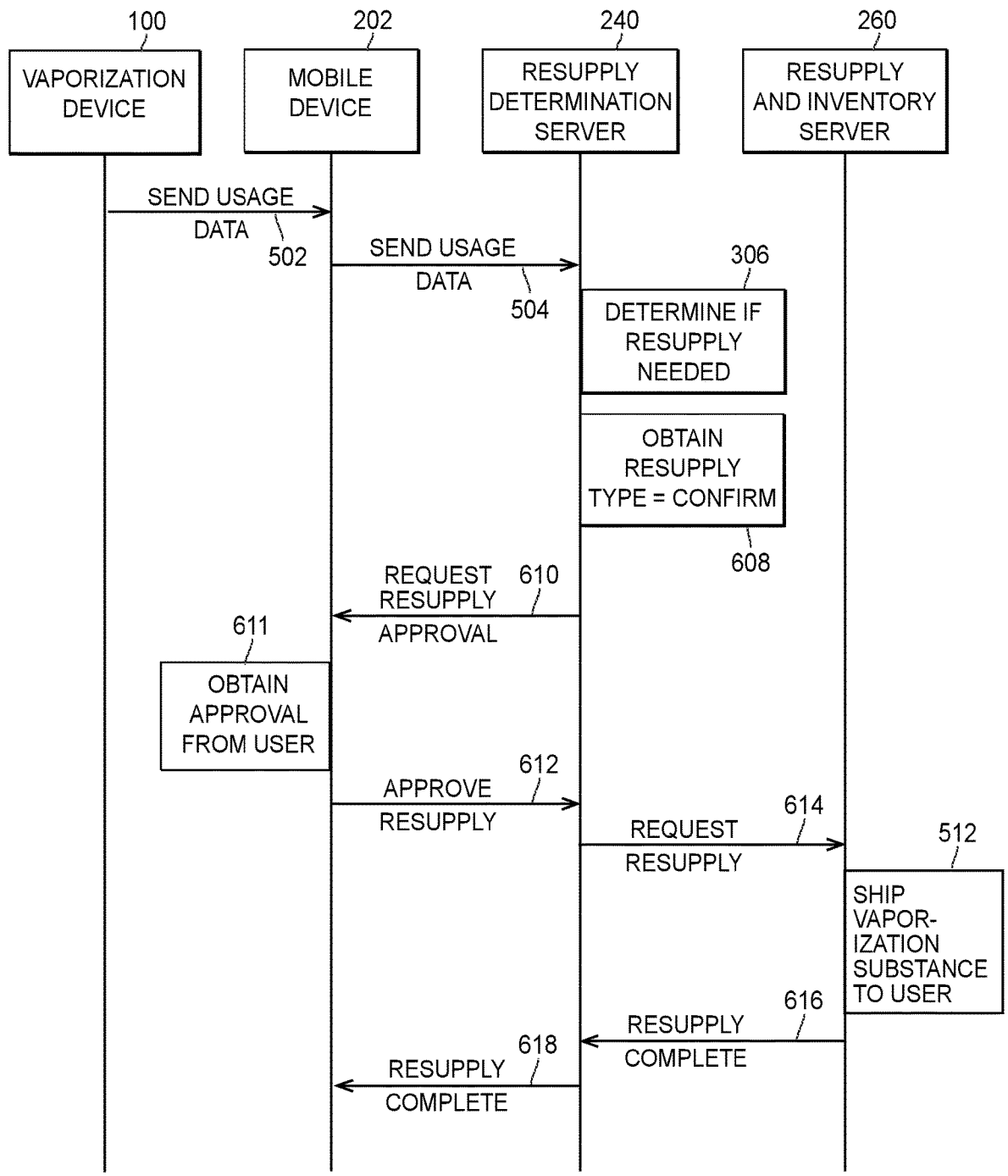
FIG. 6 is a ladder diagram showing signals communicated between elements of the resupply system with the user confirming the resupply.

FIG. 6 illustrates a ladder diagram showing signals communicated between elements of the resupply system 200 for a resupply of a container of vaporizable substance or cartridge to a user, with the user confirming the resupply. FIG. 6 shows signals between the vaporization device 100, the mobile device 202, the resupply determination server 240 and the resupply and inventory server 260. As above in FIG. 5, the resupply process begins with the vaporization device 100 sending a signal 502 to the mobile device 202, which contains vaporization usage data. The mobile device 202 then passes the vaporization usage data in signal 504 to the resupply determination server 240. The resupply determination server 240 determines at block 306 that a resupply of the vaporization device 100 is necessary based on the vaporization usage data. At block 608, the resupply determination server 240 obtains the resupply type for this user from the user record, which in this example is indicated to confirm every resupply with the user. Therefore, the resupply determination server 240 sends a signal 610 requesting confirmation of the resupply to the mobile device 202 associated with the user. The mobile device 202 then obtains the user confirmation at block 611, which may include presenting a resupply confirmation prompt to the user. Upon receiving the user confirmation, the mobile device 202 sends a signal 614 that indicates to the resupply determination server 240 that the user has approved the resupply. The resupply determination server 240 then sends a signal 614 to the resupply and inventory server 260, which then initiates a shipment of the vaporization substance to the user at block 512. The resupply and inventory server 260 then sends a signal 616 to the resupply determination server 240 indicating that the resupply has been completed. The resupply determination server 240 then sends a signal 618 to the mobile device 202 of the user that a resupply is on the way.

Figure 7:
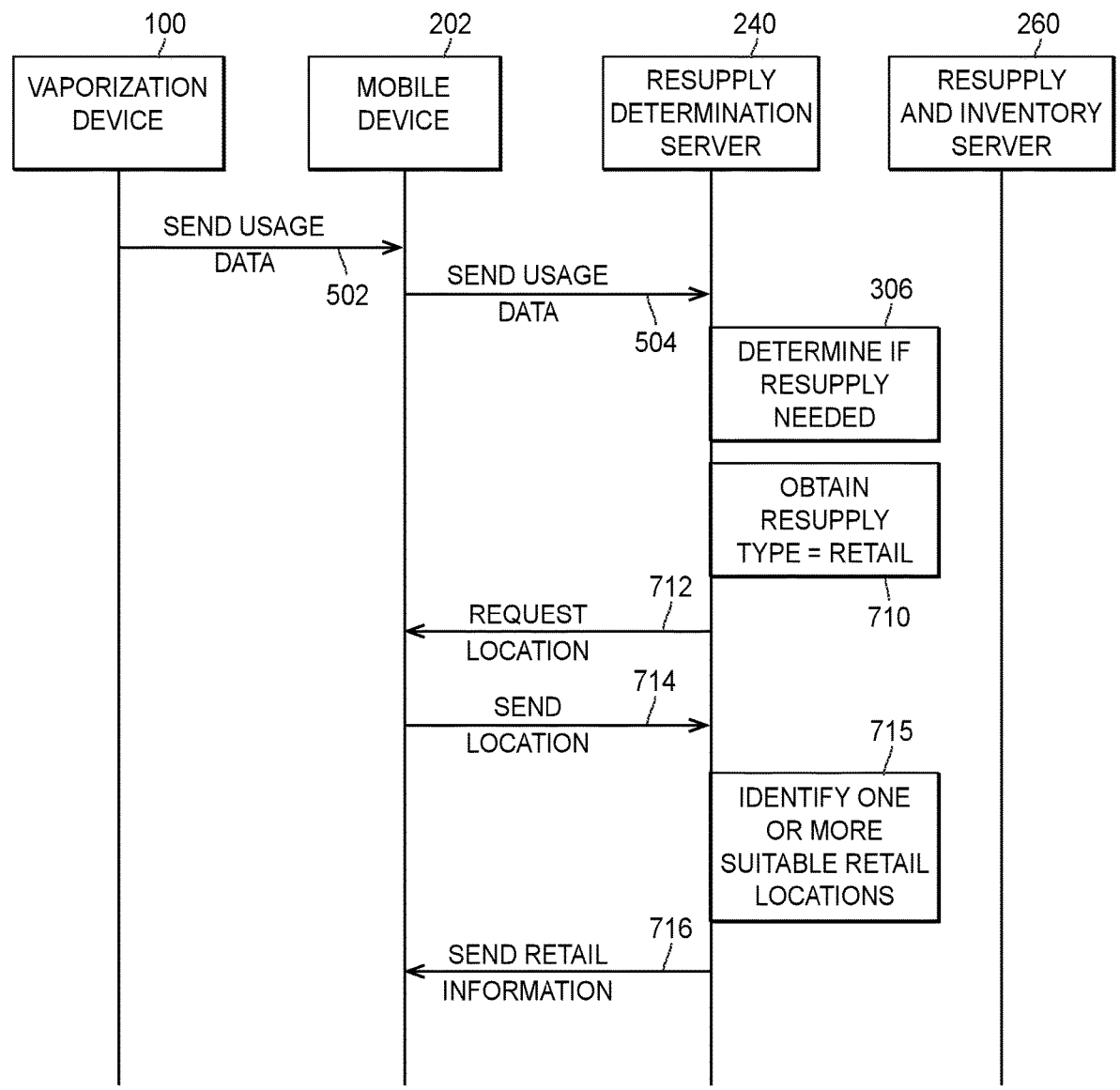
FIG. 7 is a ladder diagram showing signals communicated between elements of the resupply system for assisting with retail resupply by the user.

FIG. 7 illustrates a ladder diagram showing signals communicated between elements of the resupply system 200 for facilitating a retail resupply of a vaporizable substance or cartridge to a user. FIG. 7 shows signals between the vaporization device 100, the mobile device 202, and the resupply determination server. Although no signals are illustrated to or from the resupply and inventory server 260 in this embodiments, alternative embodiments may include communication with the resupply and inventory server 260 to identify retail locations or to determine retail location inventory levels. In FIG. 7, the resupply process begins with the vaporization device 100 sending a signal 502 to the mobile device 202, which contains vaporization usage data. The mobile device 202 then passes the vaporization usage data in signal 504 to the resupply determination server 240. The resupply determination server 240 determines at block 306 that a resupply of the vaporization device 100 is necessary based on the vaporization usage data. At block 710, the resupply determination server 240 obtains the resupply type for this user from the user record, which in this example is indicated that the user prefers a retail resupply. In response to determining a retail resupply is preferred, the resupply determination server 240 sends signal 712 to request a location from mobile device 202. In some embodiments, the mobile device 202 may determine its current location using known methods (e.g., generating GPS coordinates of the device location). If the mobile device location is unavailable, such as when the mobile device 202 has deactivated its location service, the location may be determined from the address of the user in the user record, or the user may be prompted to enter a location. The mobile device 202 then sends a signal 714 to the resupply determination server 240 that contains an indication of the location of the mobile device 202. At block 715, the resupply determination server 240 identifies one or more suitable retail locations by looking up a location of one or more nearby retailers, and determining a retailer that has the appropriate type and quantity of cartridge or vaporizable content in stock. In some embodiments, the resupply determination server 240 may communicate with the resupply and inventory server 260 to determine retailer locations or inventory levels. The resupply determination server 240 then sends a signal 716 containing the retail information to the mobile device 202 associated with the user. Such retail information may include an indication of the location of one or more retailers, contact information of the retailers, or links to online information regarding the retailers.

Figure 8:
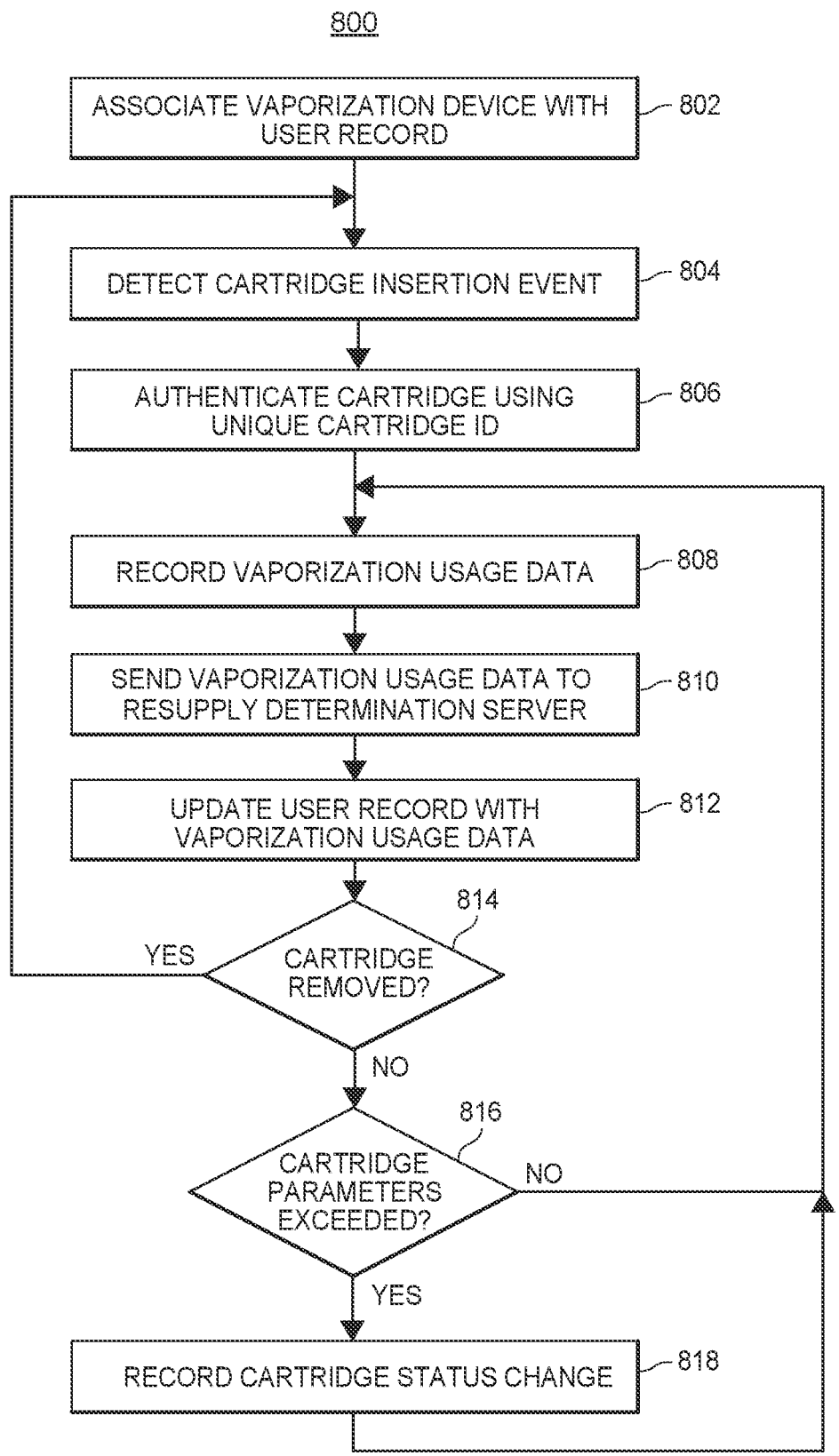
FIG. 8 is a flow diagram of an exemplary vaporization monitoring method 800 that may be used to obtain vaporization usage data for a user.

FIG. 8 illustrates a flow diagram of an exemplary vaporization monitoring method 800 that may be used to obtain vaporization usage data for a user. The method 800 may be implemented by the vaporization device 100 and the computing system 230 to generate and record vaporization usage data relating to use of specific cartridges. In embodiments according to the method 800, each cartridge stores a unique cartridge identifier (ID) that allows individual cartridges to be distinguished. In contrast, other methods may simply determine the type or lot of a cartridge, such as a Stock Keeping Unit (SKU) code. By using a unique cartridge ID, however, more accurate vaporization usage data is obtained, particularly where users regularly swap partially used cartridges within the vaporization device 100. For example, a user may initially insert and use a first cartridge of a first type, then remove the first cartridge and replace it with a second cartridge of a second type. After using the second cartridge (either completely or partially), the user may remove the second cartridge and reinsert the first cartridge. In so doing, the user may select vaporization content that best suits the user's current preferences over the course of a day or over the course of several days. After initial use, the quality of vaporizable content in a cartridge degrades over time, but many cartridges retain acceptable quality for several days following initial use. Additionally, in some embodiments, the unique cartridge ID may be encrypted to prevent counterfeiting through copying or refilling used cartridges.

The vaporization monitoring method 800 begins with associating a vaporization device 100 with a user record (block 802), which may include creating a new user record if no record exists for the user. Next, a cartridge insertion event is detected when a replaceable cartridge 118 is inserted into the vaporization device 100 (block 804), at which point the cartridge is authenticated using the unique cartridge ID (block 806). While the replaceable cartridge 118 is inserted within the vaporization device 100, vaporization usage data is recorded (block 808) and sent to the resupply determination server 240 (block 810), which updates the user record based upon the vaporization usage data (block 812). Such monitoring continues until either (i) it is determined that the cartridge has been removed from the vaporization device 100 (block 814), at which point the method 800 waits for a new cartridge insertion event, or (ii) maximum cartridge operating parameters are determined to have been exceeded (block 816), at which point a cartridge status change is recorded (block 818) and usage monitoring continues. Additional or alternative aspects may be included in some embodiments.

At block 802, the computer system 230 associates a vaporization device 100 with a user record, such as during an initial or subsequent registration process. Such registration may include age or identity verification, as well as association of the vaporization device 100 with a mobile device 202 of the user. If no user record is found for the user, the resupply determination server 240 may create a new user record and associated it with the user and the vaporization device 100. The vaporization device 100 may be locked in order to prevent unauthorized operation (e.g., use by a minor) until it has been activated through association with a user record.

At block 804, the vaporization device 100 attempts to detect a cartridge insertion event after activation. A cartridge insertion event is associated with a replaceable cartridge 118 being inserted within the body 106 of the vaporization device 100 for use. Such a cartridge insertion event may be detected based upon an electrical power or data connection between the body 106 and the replaceable cartridge 118. In some embodiments, the processor 132 of the vaporization device 100 periodically attempts to read a cartridge memory 170 until a successful connection is detected upon insertion of the replaceable cartridge 118. In further embodiments, a cartridge insertion event may be indicated by the user via an input of the mobile device 202 or of the vaporization device 100.

At block 806, the vaporization device 100 reads the unique cartridge ID from the cartridge memory 170 and attempts to authenticate the replaceable cartridge 118. In some embodiments, authenticating the replaceable cartridge 118 may comprise determining based upon the unique cartridge ID that the cartridge is a type that is compatible with the vaporization device 100. In further embodiments, authenticating the replaceable cartridge 118 comprises determining the unique cartridge ID matches a record of an authentic and valid vaporization cartridge based upon communication with the computing system 230. In such embodiments, the vaporization device 100 sends the unique cartridge ID to the mobile device 202, which further communicates the unique cartridge ID to the resupply determination server 240 for authentication. When the resupply determination server 240 receives the unique cartridge ID, it either authenticates the received unique cartridge ID by comparison against a database of cartridge IDs or further sends the received unique cartridge ID to an authentication server for verification. In some embodiments, the unique cartridge ID is encrypted to further secure the cartridges and prevent counterfeiting. In such embodiments, the encrypted unique cartridge ID may be communicated from the vaporization device 100 to the mobile device 202 and then to the resupply determination server 240 for verification, in which case the resupply determination server 240 may decrypt the encrypted unique cartridge ID or may send the encrypted unique cartridge ID to an authentication server for decryption and verification. The encrypted unique cartridge ID may be encrypted using known public key infrastructure (PKI) encryption techniques, to ensure the encrypted unique cartridge ID can only be decrypted by the computing system 230. Whether or not the unique cartridge ID is encrypted, an authentication confirmation message is sent from the resupply determination server 240 to the mobile device 202 upon verification of the unique cartridge ID. The mobile device 202 then further communicates successful authentication to the vaporization device 100, thereby enabling the vaporization device 100 to operate (e.g., unlocking or activating the vaporization device 100). In some embodiments, the mobile device 202 manages authentication and other requirements for operation of the vaporization device 100, thus directly controlling locking and unlocking the vaporization device 100 upon each use, without the vaporization device 100 maintaining a state variable for authentication of the replaceable cartridge 118.

At block 808, the vaporization device 100 monitors and records vaporization usage data as the cartridge is used within the vaporization device 100. Some such vaporization usage data may be generated based upon measurement by the sensors 140 of the vaporization device 100, such as data relating to puff count, puff duration, draw force applied to each puff, vaporization temperature or other measurements of the physical operation of the vaporization device 100. In some embodiments, the processor 132 may further generate vaporization usage data, such as data regarding time between puffs, total energy use or total session time when the vaporization device is active or unlocked. In some embodiments, data quality rules may be applied to the raw data in order to improve the reliability of the vaporization usage data. For example, puffs in the raw data having duration less than a quarter of a second may be disregarded (i.e., omitted from the recorded vaporization usage data) as being unreliable or spurious data. In this way, noise in the vaporization usage data is reduced. Immediately upon generation, the vaporization usage data is stored in the memory 164 of the vaporization device 100, from which storage the vaporization usage data is later retrieved and sent to the mobile device 202 for further storage or transmission to the resupply determination server 240.

At block 810, the stored vaporization usage data is sent to the resupply determination server 240. This may include sending the vaporization usage data from the vaporization device 100 to the mobile device 202, as well as sending the vaporization usage data from the mobile device 202 to the resupply determination server 240. Such transmission of the vaporization usage data may occur periodically or upon the occurrence of a condition (e.g., when an application of the mobile device 202 launches or connects to the vaporization device 100).

At block 812, the resupply determination server 240 updates the user record with the received vaporization usage data. This may include updating the usage metrics for the replaceable cartridge 118 or adjusting the average usage metrics for the user, such as by updating a rolling average of the usage metrics (e.g., a one-week rolling average of puff duration, draw force per puff, or puffs per cartridge). In some embodiments, a new user record may contain default values for usage metrics until the completion of a learning period (e.g., 30 days of usage), at which point user-specific metrics may be generated from the recorded vaporization usage data from the learning period. For example, the learning period metrics may assume up to five hundred puffs per cartridge, despite most users averaging one hundred to three hundred puffs per cartridge. After the learning period, a baseline of usage metrics is established, which can be updated based upon subsequent vaporization usage data. Updating such usage metrics in the user record has the advantages of further accuracy improvements and remaining current even through changes in user behavior patterns over time. In some embodiments, the usage metrics may be divided between different modes of operation of the vaporization device 100, such as a standard or normal operation mode and a low consumption or economization mode in which the rate of consumption of vaporizable content is reduced for puffs of the same duration and draw force. Distinguishing between modes of use improves the estimates of remaining cartridge supply and thus improves the resupply techniques described above.

At block 814, the vaporization device 100 determines whether the replaceable cartridge 118 has been removed from the vaporization device 100. This may be detected by a failure of the electrical connection between the body 106 and replaceable cartridge 118. When the cartridge has been removed, the vaporization device 100 attempts to detect a new cartridge insertion event at block 804, as discussed above. If the replaceable cartridge 118 has not been removed, the method 800 continues at block 816.

At block 816, the vaporization device 100, the mobile device 202, or the resupply determination server 240 determines whether one or more cartridge parameters have been exceeded. Such parameters may include total puff count, total puff duration, time elapsed since initial insertion of the replaceable cartridge 118 or a calculated metric (e.g., a metric derived from total puff count, average puff duration, average draw force per puff, and operating mode). Because users may swap partially depleted cartridges during ordinary operation of vaporization devices, in some embodiments, each active cartridge may be checked to determine whether its cartridge parameters have been exceeded. For example, a replaceable cartridge 118 that was inserted, used, and removed prior to depletion may be determined to exceed its cartridge parameters after a maximum usable duration (e.g., three days after initial insertion), even though such cartridge is not currently inserted in the vaporization device 100. When maximum cartridge parameters are determined to have been exceeded, the method 800 continues at block 818. Otherwise, the method 800 continues to monitor usage by recording vaporization usage data at block 808.

At block 818, the resupply determination server 240 records a cartridge status change based upon a replaceable cartridge 118 having been determined to have exceeded its cartridge parameters. The relevant cartridge is recorded as being fully depleted to prevent counterfeiting or unauthorized refilling, which can degrade system performance. In some embodiments, such cartridge may be deauthenticated, and the vaporization device 100 may be controlled not to operate when such cartridge is inserted. Alternatively, the vaporization device 100 may continue operation with such previously authenticated cartridge, despite having exceeded its maximum cartridge parameters. In some such embodiments, an inferred new cartridge insertion may be recorded to account for such operation in excess of the cartridge parameters. For example, an inferred new cartridge insertion may be recorded under the assumption that the user has refilled the cartridge. After the cartridge status change has been recorded, the method 800 may continue to monitor usage by recording vaporization usage data at block 808. The method 800 thus continuously monitors the use of the vaporization device 100 until it is disassociated with the user record.

Although individual operations of one or more methods are illustrated and described as separate operations, one or more of the individual operations may be performed concurrently, and nothing requires that the operations be performed in the order illustrated unless so stated. Structures and components functionality presented as separate components in example configurations may be implemented as a combined structure or component in alternative embodiments. Similarly, functionality of structures and components presented as a single component may be implemented as separate components. These and other variations, modifications, additions, and improvements fall within the scope of the subject matter herein.

As used herein, the term non-transitory computer-readable storage medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed:

1. A computing system configured for resupplying vaporization devices, comprising:
   one or more processors;
   a program memory communicatively connected to the one or more processors and storing executable instructions that, when executed by the one or more processors, cause the computing system to:
     obtain vaporization usage data generated by a vaporization device, the vaporization usage data indicating use of a vaporizable content of a cartridge separate from and removably connected to the vaporization device by (i) obtaining a unique cartridge identifier from a cartridge memory of the cartridge at a time of initial use of the cartridge and (ii) authenticating the cartridge using the unique cartridge identifier;
     associate the vaporization usage data with a user record of a vaporization device user based upon the unique cartridge identifier, the user record containing user data that indicates a rate of consumption of a type of vaporizable content by the vaporization device user and the vaporization usage data including the time of initial use of the cartridge;
     determine an estimated remaining supply of the type of vaporizable content possessed by the vaporization device user at a determination time associated with occurrence of a condition associated with the cartridge based upon the vaporization usage data and the user record, including (i) determining a time elapsed since the time of initial use of the cartridge exceeds an expiration threshold and (ii) excluding the cartridge from the estimated remaining supply based upon such determination that the time elapsed has exceeded the expiration threshold, wherein the condition comprises receiving an additional usage data message generated upon activation of the vaporization device when the cartridge is not connected to the vaporization device;
     determine to resupply one or more cartridges of the type of vaporizable content based upon the estimated remaining supply and the rate of consumption; and
     perform an action to facilitate obtaining a replacement cartridge of the type of vaporizable content.

2. The computing system of claim 1, wherein:
   the computing system comprises a server communicatively connected via a communication network to a mobile device, the mobile device being associated with the vaporization device and receiving the vaporization usage data from the vaporization device;
   the server receives the vaporization usage data from the mobile device; and
   the mobile device generates the additional data usage message upon the activation of the vaporization device by an application running on the mobile device.

3. The computing system of claim 1, wherein:
   the computing system comprises a mobile device communicatively connected to the vaporization device via a wireless communication link; and
   the computing system receives the vaporization usage data from the vaporization device via the wireless communication link.

4. The computing system of claim 1, wherein the executable instructions that cause the computing system to determine to resupply the cartridge cause the computing system to determine when to resupply the cartridge based upon a fulfillment time or a delivery time.

5. The computing system of claim 1, wherein the executable instructions that cause the computing system to perform the action to facilitate obtaining the replacement cartridge cause the computing system to automatically resupply one or more new cartridges to the vaporization device user at a shipping address of the vaporization device user based upon the vaporization usage data and previously specified user preferences stored in the user record.

6. The computing system of claim 1, wherein the executable instructions that cause the computing system to perform the action to facilitate obtaining the replacement cartridge cause the computing system to:
   request approval from the vaporization device user for obtaining the replacement cartridge;
   receive an indication of approval from the vaporization device user; and
   resupply one or more cartridges to the vaporization device user in response to the indication of approval.

7. The computing system of claim 1, wherein the executable instructions that cause the computing system to perform the action to facilitate obtaining the replacement cartridge cause the computing system to:
   determine a location of the vaporization device user;
   identify one or more retailers of cartridges of the type of vaporizable content based upon the location of the vaporization device user; and
   provide information regarding a location of the one or more retailers to the vaporization device user.

8. The computing system of claim 1, wherein:
the user data further comprises data regarding one or more additional cartridges possessed by the vaporization device user; and
the executable instructions that cause the computing system to determine the estimated remaining supply cause the computing system to determine a remaining supply in the one or more additional cartridges.

9. The computing system of claim 1, wherein the executable instructions further cause the computing system to update the user data that indicates the rate of consumption of the type of vaporizable content by the vaporization device user based upon the vaporization usage data.

10. A method for resupplying vaporization devices, comprising:
obtaining, by one or more processors, vaporization usage data generated by a vaporization device, the vaporization usage data indicating use of a vaporizable content of a cartridge separate from and removably connected to the vaporization device by (i) obtaining a unique cartridge identifier from a cartridge memory of the cartridge at a time of initial use of the cartridge and (ii) authenticating the cartridge using the unique cartridge identifier;
associating, by the one or more processors, the vaporization usage data with a user record of a vaporization device user based upon the unique cartridge identifier, the user record containing user data that indicates a rate of consumption of a type of vaporizable content by the vaporization device user and the vaporization usage data including the time of initial use of the cartridge;
determining, by the one or more processors, an estimated remaining supply of the type of vaporizable content possessed by the vaporization device user at a determination time associated with occurrence of a condition associated with the cartridge based upon the vaporization usage data and the user record, including (i) determining a time elapsed since the time of initial use of the cartridge exceeds an expiration threshold and (ii) excluding the cartridge from the estimated remaining supply based upon such determination that the time elapsed has exceeded the expiration threshold, wherein the condition comprises receiving an additional usage data message generated upon activation of the vaporization device when the cartridge is not connected to the vaporization device;
determining, by the one or more processors, to resupply one or more cartridges of the type of vaporizable content based upon the estimated remaining supply and the rate of consumption; and
performing, by the one or more processors, an action to facilitate obtaining a replacement cartridge of the type of vaporizable content.

11. The method of claim 10, wherein the vaporization usage data comprises one or more of: a puff count, a time since the cartridge was replaced, an average puff duration, a percentage of the vaporizable content of the cartridge used or a percentage of the vaporizable content of the cartridge remaining.

12. The method of claim 10, wherein:
the user data further comprises data regarding one or more additional cartridges possessed by the vaporization device user; and
determining the estimated remaining supply includes determining a remaining supply in the one or more additional cartridges.

13. The method of claim 10, further comprising:
updating, by the one or more processors, the user data that indicates the rate of consumption of the type of vaporizable content by the vaporization device user based upon the vaporization usage data.

14. A non-transitory computer-readable storage medium storing executable instructions that, when executed by one or more processors of a computing system, cause the computing system to:
obtain vaporization usage data generated by a vaporization device, the vaporization usage data indicating use of a vaporizable content of a cartridge separate from and removably connected to the vaporization device by (i) obtaining a unique cartridge identifier from a cartridge memory of the cartridge at a time of initial use of the cartridge and (ii) authenticating the cartridge using the unique cartridge identifier;
associate the vaporization usage data with a user record of a vaporization device user based upon the unique cartridge identifier, the user record containing user data that indicates a rate of consumption of a type of vaporizable content by the vaporization device user and the vaporization usage data including the time of initial use of the cartridge;
determine an estimated remaining supply of the type of vaporizable content possessed by the vaporization device user at a determination time associated with occurrence of a condition associated with the cartridge based upon the vaporization usage data and the user record, including (i) determining a time elapsed since the time of initial use of the cartridge exceeds an expiration threshold and (ii) excluding the cartridge from the estimated remaining supply based upon such determination that the time elapsed has exceeded the expiration threshold, wherein the condition comprises receiving an additional usage data message generated upon activation of the vaporization device when the cartridge is not connected to the vaporization device;
determine to resupply one or more cartridges of the type of vaporizable content based upon the estimated remaining supply and the rate of consumption; and
perform an action to facilitate obtaining a replacement cartridge of the type of vaporizable content.

15. The non-transitory computer-readable storage medium of claim 14, wherein the executable instructions that cause the computing system to perform the action to facilitate obtaining the replacement cartridge cause the computing system to automatically resupply one or more new cartridges to the vaporization device user at a shipping address of the vaporization device user based upon the vaporization usage data and previously specified user preferences stored in the user record.

16. The non-transitory computer-readable storage medium of claim 14, wherein:
the user data further comprises data regarding one or more additional cartridges possessed by the vaporization device user; and
the executable instructions that cause the computing system to determine the estimated remaining supply cause the computing system to determine a remaining supply in the one or more additional cartridges.

17. The non-transitory computer-readable storage medium of claim 14, wherein the executable instructions further cause the computing system to update the user data that indicates the rate of consumption of the type of vaporizable content by the vaporization device user based upon the vaporization usage data.

* * * * *